(12) United States Patent
Robinett et al.

(10) Patent No.: US 6,563,269 B2
(45) Date of Patent: May 13, 2003

(54) RECHARGEABLE PORTABLE LIGHT WITH MULTIPLE CHARGING SYSTEMS

(76) Inventors: Mark I. Robinett, 207 Terrace Ave., San Rafael, CA (US) 94901; Don Snyder, P.O. Box 3688, Napa, CA (US) 94558

( * ) Notice: Subject to any disclaimer, the term of this patent is extended or adjusted under 35 U.S.C. 154(b) by 29 days.

(21) Appl. No.: 09/731,551

(22) Filed: Dec. 6, 2000

(65) Prior Publication Data

US 2002/0067143 A1 Jun. 6, 2002

Related U.S. Application Data

(60) Provisional application No. 60/168,718, filed on Dec. 6, 1999.

(51) Int. Cl.[7] .............................................. H05B 37/00
(52) U.S. Cl. ...................................... 315/86; 315/200 A
(58) Field of Search ............................. 315/286, 200 A, 315/150, 152, 159, 86; 362/275, 800

(56) References Cited

U.S. PATENT DOCUMENTS 3,809,882 A  *  5/1974  Wetmore ..................... 362/183
5,015,918 A  *  5/1991  Copeland ..................... 315/179
5,633,565 A  *  5/1997  Friedman et al. ............. 136/291
5,793,184 A  *  8/1998  O'Connor .................... 320/101

* cited by examiner

Primary Examiner—Don Wong
Assistant Examiner—Chuc Tran

(57) ABSTRACT

A rechargeable portable light having a housing member with an opening for the emission of light, and several possible charging systems including a solar panel, an AC charger, an auto charger, and a hand crank generator charger. An electronic circuit is located within the housing member and includes at least one super capacitor for power storage. The super capacitor is charged by a charging system. A power inverter circuit, a mechanical switch method, or a DC-DC IC is used to increase voltage and regulate current. The circuit also includes at least one light emitting diode (LED) positioned near the opening in the housing member, and a switch interposed between the capacitor and the LED. The switch is closed when power is delivered from the capacitor to the LED.

19 Claims, 16 Drawing Sheets

RECHARGEABLE PORTABLE LIGHT WITH MULTIPLE CHARGING SYSTEMS

CROSS REFERENCE TO RELATED APPLICATIONS

The present application claims the benefit of the filing date of U.S. Provisional Application, Ser. No. 60/168,718, filed Dec. 6, 1999.

BACKGROUND OF THE INVENTION

1. Field of the Invention

The field of this invention relates to flashlights and other portable lighting devices, which are used in the home (inside and outside), in automobiles, for personal safety and emergency uses, for camping and recreation, for construction, for law enforcement uses, etc. More specifically, this invention relates to flashlights and other portable lights that have the charging and power storing mechanisms contained within them, wherein there is no need for batteries or an external electrical power source to charge the portable light. This invention also relates to portable lights that can be charged in a variety of ways from external electrical sources.

2. Discussion of Related Art

Ordinary flashlights and portable lights have been in use for many years throughout the world. The most popular kinds of flashlights and portable lights use disposable batteries and replaceable light bulbs. There are also a number of portable lights available today that contain rechargeable batteries, typically used in connection with home recharging units in which plugging the light into an ordinary home electrical outlet will charge the batteries. However, eventually these kinds of portable lights need new batteries, as the rechargeable batteries become depleted and incapable of holding a charge after extensive use.

There would be many advantages in having a portable light that never needs a change of batteries, never needs a bulb replacement, and never needs to be charged from an electrical power source. The applications for such a light include inside and outside home use, automobiles emergency use, camping, bicycling, general emergency use, construction and law enforcement uses, and numerous uses in underdeveloped countries. Such a light would also represent an economic and ecological advantage in reversing the environmental impact of discarded batteries, such as nickel-cadmium batteries; the most commonly used, highly toxic, rechargeable battery. Such a light also represents a very important advantage in situations or countries where no batteries, no bulbs and no electrical power sources are available, or where batteries are expensive or of poor quality.

The most popular flashlights and portable lights used in the world today are described in U.S. Pat. No. 4,032,773, U.S. Pat. No. 4,041,304, U.S. Pat. No. 4,151,583 and closely related prior art. These flashlights have one or more disposable batteries, a single on/off switch, and a light bulb backed by a reflective cone and covered with a glass or plastic lens. The major problem with these types of flashlights are that the battery charge decays with use and the batteries must be replaced regularly. This is costly, inconvenient, and has a negative environmental impact. In addition, the bulbs burn out and require replacement costs and wasted time in locating new bulbs.

Rechargeable flashlights and portable lights have been described in several United States patents, including: U.S. Pat. No. 3,787,678; U.S. Pat. No. 3,829,676; U.S. Pat. No. 4,045,663; U.S. Pat. No. 4,819,139; U.S. Pat. No. 4,794,315; U.S. Pat. No. 4,325,107; and U.S. Pat. No. 4,357,648. The portable lights disclosed in these patents have rechargeable batteries that last many times longer than the typical disposable batteries in typical flashlights. However, the principal problem with rechargeable battery flashlights is that the rechargeable batteries wear out and must be replaced, and these batteries, which are often nickel-cadmium batteries, pose dangerous problems to the environment if not disposed of properly. Another problem with this type of portable light is that recharging requires a connection to an external power source, usually a home outlet. This charging has the drawback of using some electricity at some cost, but more importantly it is inconvenient if one is away from home.

Other portable lights using solar cells for charging the batteries have been described in U.S. Pat. No. 5,621,303, and EP 5,3143,8A1. The devices disclosed therein use rechargeable batteries that wear out and require replacement.

A portable light with a hand-crank generator has been described in U.S. Pat. No. 4,360,860. This light also has the problem of the rechargeable battery needing replacement at some time.

U.S. Pat. No. 5,782,552 describes a light used for highway signaling purposes, which employs a solar panel for charging, a capacitor for electrical storage and a blinking LED for the signal light. This patent describes a specific circuit for charging the capacitor when light is available and automatically energizing the blinking LED when ambient light is below a pre-determined level, and a means to stop energizing the LED when the ambient light is above a pre-determined level. This art does not describe the use of a bright-white LED (non blinking), which is used in the present invention for the source of light. In addition, the '552 patent makes no reference and provides no means of using the system for flashlights, portable lighting for home, recreation, automobile or emergency uses.

U.S. Pat. No. 5,975,714 describes a rechargeable flashlight using a capacitor for energy storage, an LED for light, and a linear motion generator to generate the power that is stored in the capacitor. This portable light has several problems. First, it uses a small Farad capacitor, (1 Farad), which holds enough power for only about 5 minutes of light. Secondly, this portable light provides no other means, other than the shaking, to charge the capacitor. One final problem with the '714 is that the light intensity fades quickly; it starts out at full brightness, within one minute it is at half brightness, at 2 minutes it is at ¼ brightness, and after 4 minutes it is about 8% of full brightness.

SUMMARY OF THE INVENTION

The flashlight and portable light of the present invention overcomes the battery replacement and disposal problems associated with known art by using a super capacitor for storage of electricity rather than any type of battery. As a result battery replacement is entirely obviated. The super capacitor used in this invention can be recharged and discharged over a million times without losing its ability to hold a full electrical charge. In addition, if disposal of a super capacitor is ever necessary, it poses no environmental hazard as it is made of environmentally friendly activated charcoal.

The present invention overcomes electrical charging problems associated with much of the prior art by using an exterior solar panel to charge the storage capacitor. When sufficient light is available, the solar panel generates electricity that is then stored by the capacitor. Three additional charging options are provided in the present invention, including a home charger unit, a car charger unit, and a crank-generator charger (internal or external). The home charger and the car charger can charge the capacitor in this invention fully in 30 seconds. Either one of these chargers can be plugged into the body of the present invention via a conventional charging receptacle or plug for charging, or the charging circuitry can be incorporated into the body of the portable light so that either an AC plug or a cigarette lighter plug can extend from the unit for connection to either outlet. In the portable light embodiment having a crank-generator charger, the rate at which the capacitor is charged varies according to how rapidly the crank is turned and how many revolutions are completed.

The present invention overcomes the bulb replacement problem by using a high brightness white LED (light emitting diode). The LED used in this invention is rated to last for up to 50,000 hours in continuous use. This means that the light source (in this instance the LED) would, for all practical purposes, never need replacement. The LED uses much less power than the typical incandescent bulbs used in most conventional flashlights because very little energy is lost in the form of heat (incandescent bulbs waste large amounts of power to heat); thus a super capacitor becomes feasible for energy storage because an LED requires much less power. By using a high brightness LED that provides continuous light, the present invention also overcomes the problem associated with the device disclosed in the '552 patent that employs a colored and blinking LED.

By using an inverter circuit specifically developed for the present invention which produces constant current and voltage to the LED for a constant intensity of light during the cycle of power use from the super capacitor, the present invention solves the prior art problem of light brightness decay as voltage from the capacitor drops off. In addition, in an alternative embodiment, the present invention provides a means to increase or decrease brightness of the portable light by incorporating more than one LED. In this design, if one wants to conserve energy, one LED is turned on; if one wants more light, two or more LEDs can be turned on as needed. This feature allows the portable light of the present invention to provide light for a long period of time when using one LED as the light source, or to provide a much brighter light when it is needed, albeit for a shorter period of time. In addition, means are provided to lower the current to ½ or ¼ to one LED to further conserve power if desired.

The present invention consists of a solar panel (comprising a plurality of electrically connected photovoltaic cells) that produces power to charge a high farad capacitor. A blocking diode is in line to prevent current leakage back to the solar panel when it is not charging. A voltage limiting circuit is in line with the solar panel, to limit the voltage going to the capacitor to prevent overcharging of the capacitor. In one configuration of this invention, when a switch is turned on, power stored in the capacitor travels to an inverter circuit which increases the voltage to the proper level for the LED, and at the same time, keeps the current steady at the maximum amount for the LED. This circuit keeps the voltage and current constant during the duration of power use from the super capacitor as the voltage varies from 2.6 volts DC to 0.9 volts DC. The LED is an integral part of this inverter circuit, and it also provides the light output.

The present invention uses two methods to produce the correct voltage and current from the capacitor to the LED. This is because the capacitors used in this invention are 2.5 volts DC and the high brightness LED requires 3.2–4.0 volts DC. The first method involves the inverter circuit mentioned in the above paragraph. This circuit operates to produce the correct voltage and current to the LED and to keep the voltage and current constant during the complete cycle of power use from the super capacitor. In this configuration, the light produced by the LED is constant for the whole duration of power use from the capacitor, which lasts for approximately 62 minutes when one 100 Farad super capacitor is used.

The second method involves a switching method in which two capacitors are charged in parallel at 2.5 volts via the solar panel, home/car chargers or crank-generator charger (the capacitors cannot be charged in series), then when the on/off switch is turned on to energize the LED, this switch switches the two capacitors from parallel to series, thereby bringing the voltage from 2.5 volts to 5 volts DC. A series resistor is used to bring the current to operating levels for the LED. In this configuration, the light from the LED starts at full brightness mid gradually fades as the voltage of the capacitors drops off. This configuration uses two 50 Farad super capacitors or two 100 F capacitors, and about 1½ to 2 hours (or 3–4 hours if two 100 F capacitors are used) of light will be produced before the capacitors need recharging.

Means are provided in the present invention to charge this portable light with a portable charger plugged into a home outlet, and a portable charger plugged into a cigarette lighter in an automobile. With both of these chargers, the actual charging of the storage capacitor is very fast depending on the current output of the charger. Charging of a 100 Farad capacitor using a 10 Amp current at 2.5 V, DC (provided by a home charger or a car charger) will charge the capacitor in approximately 30 seconds. This fast charging represents a substantial advantage over conventional rechargeable flashlights, which typically take 3 hours or more to charge fully. A capacitor charges quickly because there is very little restriction in its ability to take on a charge.

The combination of a solar panel, optional home and car chargers (or a crank-generator) a 100 farad super capacitor for electricity storage, and a high brightness white LED for light produces a portable light that can hold enough electricity for one to two hours of light before needing to be recharged. Super capacitors of up to 100 farads are now available at economical costs for use in flashlights and other portable lights. Larger storage capacities are accomplished by adding additional capacitors (i.e. when two 100 F capacitors are used in a flashlight, light for up to 2–4 hours is produced, depending on the mechanism used to transfer power to the LED). The super capacitors of the present invention are small enough in size to be used in very portable lights (a typical 100 F at 2.5 Volts capacitor measures 3.5 cm×5 cm.). Smaller, more portable and less expensive flashlights are included in the present invention using other size capacitors such as 20 F and 50 F in addition to 100 F capacitors, although all these sizes of capacitors were tested in the prototyping of this invention and the 50 F and 100 F capacitors performed the best in their ability to hold a charge. Therefore the 50 F and 100 F capacitors are the preferred storage capacitors used in this invention. Furthermore, the 100 F capacitors performed the best in holding a charge. Our testing showed that once a 100 F capacitor was charged fully, it would loose about 23% of its useable power (2.5 V to 0.9 V) after 6 weeks, and about only about 30% of its useable power after 3 months. This indicates that these super capacitors store power longer than typical nickel cadmium rechargeable batteries.

The preferred embodiment of this invention uses the previously described inverter circuit to increase voltage and keep current constant from the capacitor to the LED.

Because this circuit is able to operate within a voltage input range of 0.9 V to 1.7 V, DC, a single dry cell 1.5 V battery can also be used to drive this circuit. Therefore, the present invention can easily incorporate the means to use a single battery, such as one AAA 1.5 V battery to operate this light. One AAA battery will power one high brightness LED for 6–8 hours when the inverter circuit presented in this invention is used. The use of a single 1.5 V battery in this embodiment can therefore be considered as use as a backup to the super capacitor for a power source, or it can be considered to be a primary power source in this embodiment. In other words, the inverter circuit presented in this embodiment provides the means to power a high brightness 4 V LED from a single 1.5 V battery.

The present invention is also proposed for use in five additional lighting applications: In use as an outdoor landscaping light, an outdoor home light, as a bicycle light (front or rear), as a portable reading light, and as a portable indoor house light.

In summary, the present invention solves several problems of the prior art devices, including: (1) battery replacement and disposal problems (for both rechargeable and non-rechargeable batteries); (2) charging speed problems, and the lack of charging options; (3) the limitation of high power use and the replacement problem of incandescent bulbs; (4) the limitation of colored and/or blinking LEDs; (5) energy conservation due to the lack of options in selectively providing a very bright light or less bright light to conserve stored power; (6) and the problem of brightness decay when power from a super capacitor is used to run a LED.

The present invention generally comprises a housing suitable to its particular application, a charging system (a solar panel, a home charger unit, a car charger unit, a crank-generator, or any combination of these), a storage system that will last, in most instances, longer than a typical human lifetime, an electronic assembly for delivering current from the storage system to an LED, and an LED that will never need replacement in ordinary use. The solar panel is positioned on the housing exterior. In addition, the present invention provides the means for quick charging from home or auto power sources, or via a crank-generator system. Also included are more than one white LED that may be selectively used individually or collectively depending upon the need for light output or the desire to conserve power. In another embodiment, the present invention uses one white LED with the option of switching inline a series resistor to cut the power to the LED to ½ or ¼ to double or quadruple the duration of light available. The present invention describes a truly portable light that will never need to be charged by an external electrical source (although it can be quickly charged from external power sources), will never need a battery replacement, and will never need a LED (or a light bulb) replacement in most cases.

DETAILED DESCRIPTION OF THE DRAWINGS

Figure 1:
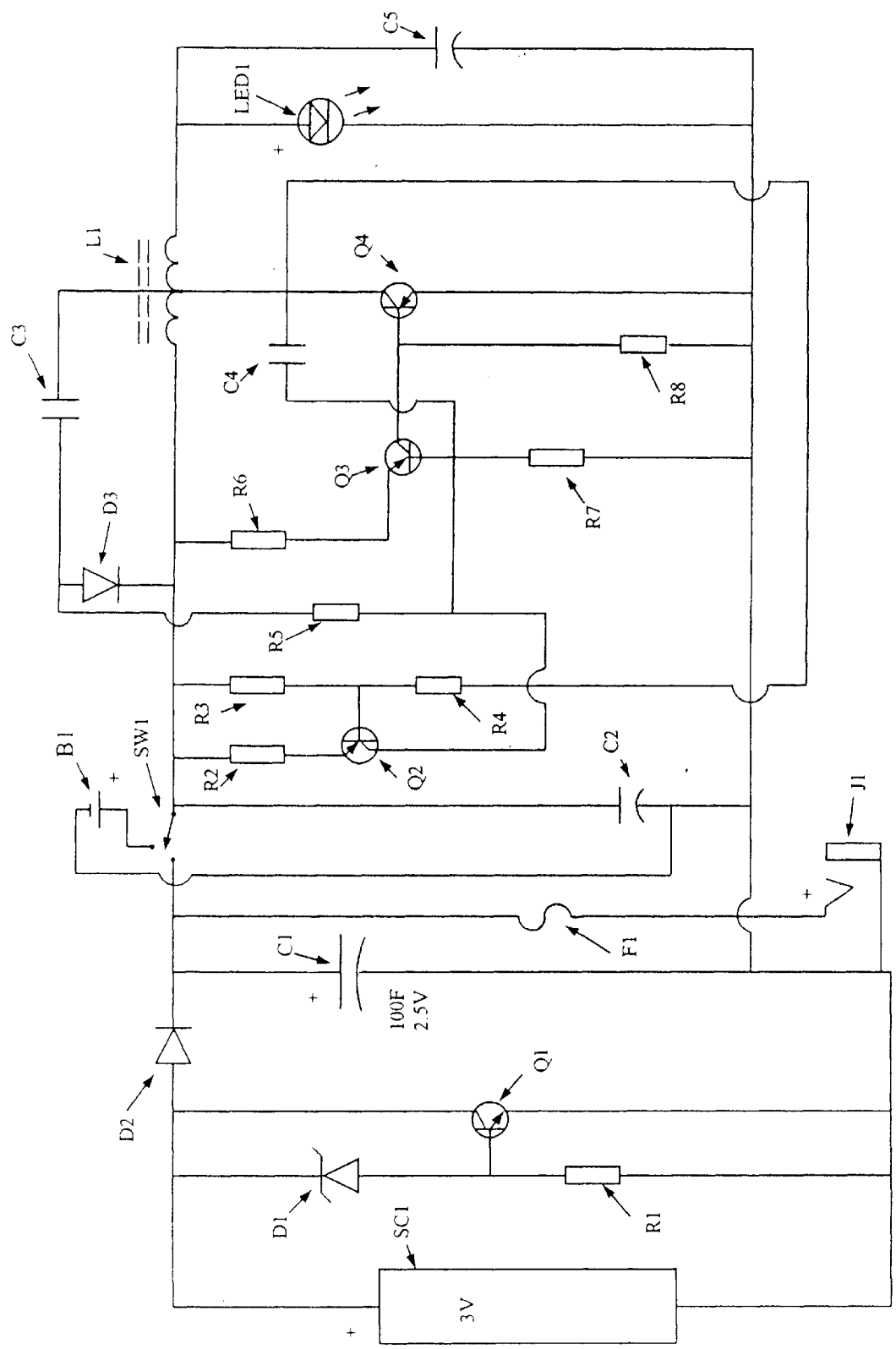
FIG. 1 is schematic diagram of the solar rechargeable light circuit consisting of a voltage limiting circuit on the solar panel output, and an inverter circuit to increase voltage and to keep current constant from the storage super capacitor to the high brightness LED.

FIG. 1 is a schematic diagram of the rechargeable portable light of the present invention. This view shows that in a first preferred embodiment, the light circuitry includes a voltage limiting circuit D1, Q1 and R1 on the solar panel SC1 output, and an inverter circuit to increase voltage and keep current constant from the super capacitor C1 to high brightness LED1. The inverter circuit operates using the super capacitor C1 as a power source beginning at a voltage of 2.5 to 2.7 volts, and dropping to about 0.9 volts during use. This inverter circuit keeps voltage and current approximately steady to LED 1 during this power use cycle, and throughout the voltage drop from C1. As depicted in FIG. 1, the inverter circuit consists of all circuitry to the right of SW1 and J1. Also shown in this circuit is the means to use a single 1.5 V battery B1 as a backup power supply to capacitor C1. Switch SW1 has three settings: Off, On from C1, and On from B1. To supply power to a high brightness LED from a lower voltage source requires a special circuit design since there are no linear circuits already for this application. Several problems exist that make existing IC's unusable: First, the output from the supply is not a voltage, but a current source into about four volts. The voltage varies depending on the LED type and current. Most IC's are designed for voltage out. Second, an output capacitor is not used because the output is pulsed and therefore the internal diode of a DC-DC IC would be undesirable. Third, the output current must not vary with a large voltage range input. The input voltage varies from about 0.9 volts to 2.7 volts and most IC's have trouble that low. Fourth, the circuit must be low cost to make the end product competitive. A discrete circuit using low cost transistors is actually cheaper than a current off the shelf DC-DC converter. It provides a lower startup voltage and easier current regulation. The theory is as follows; referring to FIG. 5 which shows a simplified circuit, showing the LED drive method. The input voltage is assumed lower than the LED operating voltage. When transistor Q4 is turned on, the current in L1 will ramp up and release to the LED when Q4 is turned off. The LED works similarly to a conventional diode in that it will not conduct in the reverse direction. Using a tapped inductor allows for a better match for power conversion. The input is typically two volts and output is about four volts.

Referring again to FIG. 1, transistors Q3 and Q4 form the drive circuit with Q3 giving the base current to Q4. Resistor R6 limits the current into the base. Resistor R5 and Capacitor C3 form the positive feedback path for oscillation. Capacitor C4 provides speed up coupling. To provide a constant average current to the LED, transistor Q2 cuts short Q3's drive for part of the cycle and changes the duty cycle. To do this, diode D3 charges C3 during the positive switch, so it will drive the base of Q3 through R5 during the negative swing. The conduction of Q2 will increase to cut off Q3 as the input voltage increases by the divider R3 and R4. Resistor R2 is set to provide the necessary gain in Q2 to limit the current at the same rate as input voltage is increased. Resistor R7 is necessary to start the circuit into operation at about one volt input. Resistor R8 is the pull down for Q4's base. Capacitor C5 smooths the pulses on the LED for better efficiency.

The schematic in FIG. 1 also includes a protective shunt regulator to prevent the solar panel from bringing the storage capacitor voltage too high. This is simply a 2.5 volt zener diode D1 driving a pull down transistor Q1 to give it more current capability and a sharper cutoff. With this regulator, the voltage is kept at the safe level for the capacitor, while most of the solar panel's current flows to storage capacitor C1.

Figure 2:
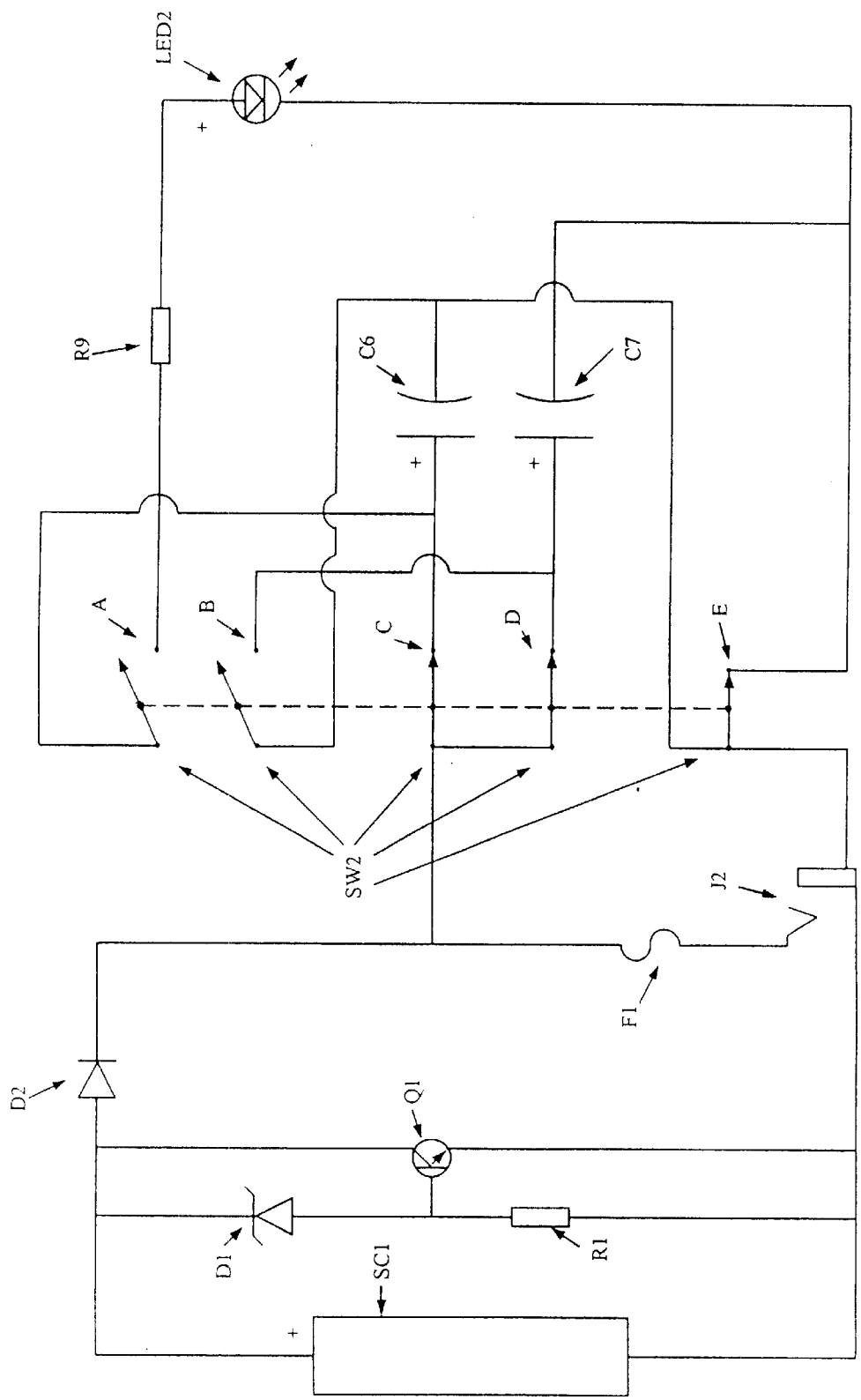
FIG. 2 is a schematic diagram of the solar rechargeable light consisting of a voltage limiting circuit on the solar panel output, and a switching mechanism to increase voltage from the storage capacitor to the high brightness LED.

FIG. 2 is a schematic diagram of the electrical circuit for the present invention using a switch mechanism SW2 to increase the voltage from 2.5 volts DC to 5 volts DC. When switch SW2 sub-switches C, D, and E are closed, switch SW2 sub-switches A and B are open, and capacitors C6 and C7 are put in parallel and can be charged at 2.5 volts DC either by the solar panel SC1, or by the home or auto charger via charging jack J2. When switch SW2 sub-switches A and B are closed, switch 3 sub-switches C, D, and E are open, capacitors C6 and C7 are put in series creating 5 volts which flow to LED2 to produce light. A series resistor R9 is used to bring the correct current to LED2. The value of series resistor R9 is determined by the equation in which R9 equals the voltage of the capacitor C6 minus the voltage drop of LED2, divided by the specified forward current of the LED2. In actual practice, a more accurate value for R9 is found by placing a milliamp meter in series after R9 and before LED2 to check the forward current to LED2, and the value of R9 is changed until the correct value of milliamps to LED2 is found. The voltage rating of solar cell SC1 is 3 volts, but voltage will go higher (up to 4 volts and slightly higher) in direct sunlight. A voltage regulating circuit consisting of R1, D1 and T1 (as described in FIG. 1) is used to protect the capacitors C6 and C7 from overcharging. Diode D2 is a blocking diode preventing current leakage from C6 and C7 back to solar panel SC1.

Figure 3:
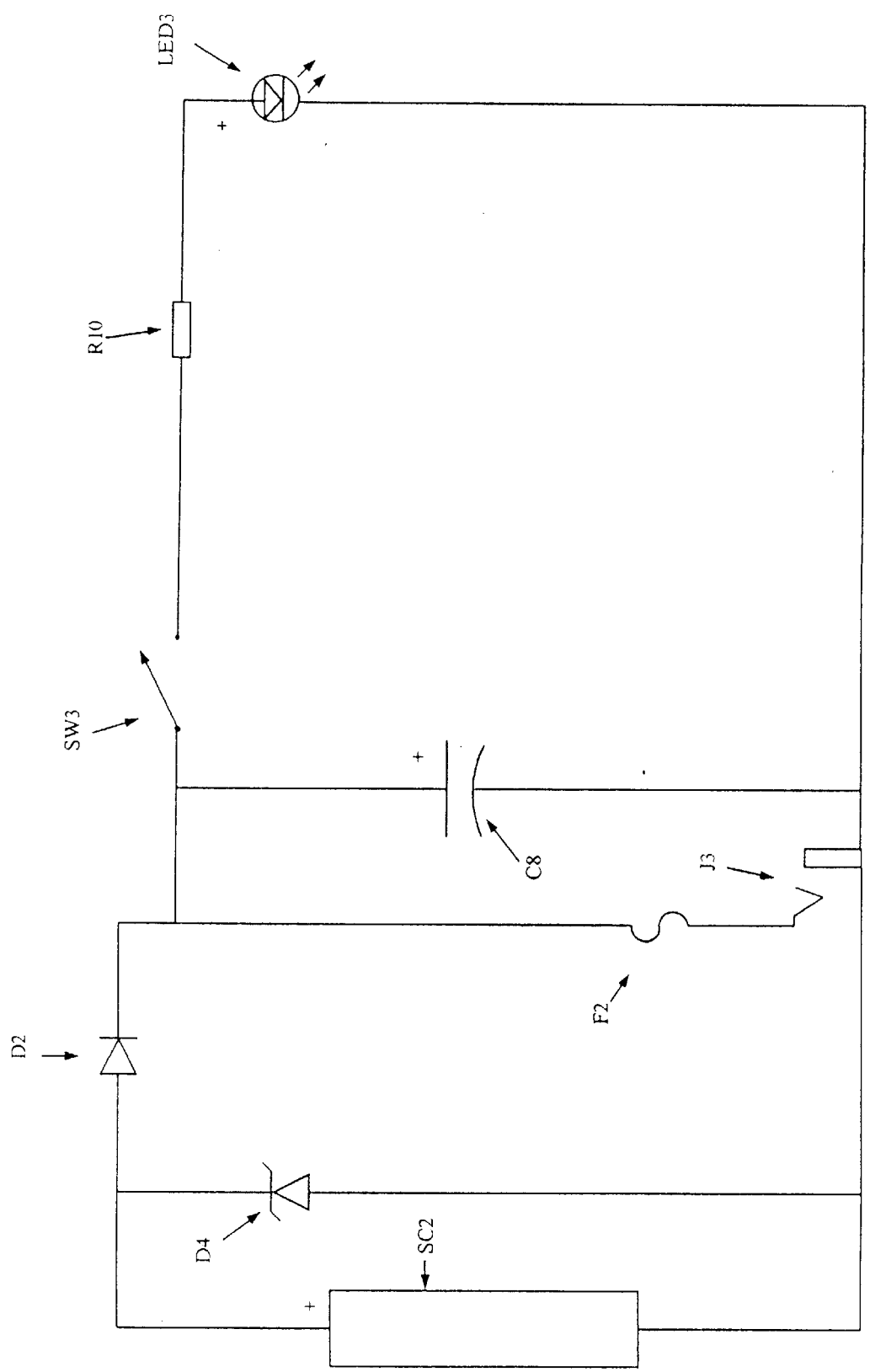
FIG. 3 is a schematic of the solar rechargeable light consisting of a simple voltage limiting circuit, a higher voltage super capacitor, and a series resistor to produce the correct voltage and current to the high brightness LED.

FIG. 3 is a schematic diagram of an electrical circuit of the present invention when C8 is a higher voltage super capacitor, e.g., 3 volts or higher. A zener diode D4 can be used to protect capacitor C8 from overcharging, and Diode D2 is used to prevent current leakage back to solar panel SC2. (A zener diode alone is not used in the previously described circuits to prevent overcharging of the super capacitors because they do not perform well at low voltages.) When switch SW3 is turned on, current flows from capacitor C8 to LED3 to produce light. In this configuration, light output drops down as voltage drops from capacitor C8. Alternatively, the inverter circuit described in FIG. 1 can be used with a slight modification (a slight modification is required because of the higher voltage of the capacitor C8, the specific modification depending on the specific voltage of capacitor C8) in place of the output circuit described here, which would keep light output constant for the duration of power use from capacitor C8. Alternatively, available DC-DC converters, as will be described in FIG. 6, may also work with higher voltage super capacitors.

Figure 4:
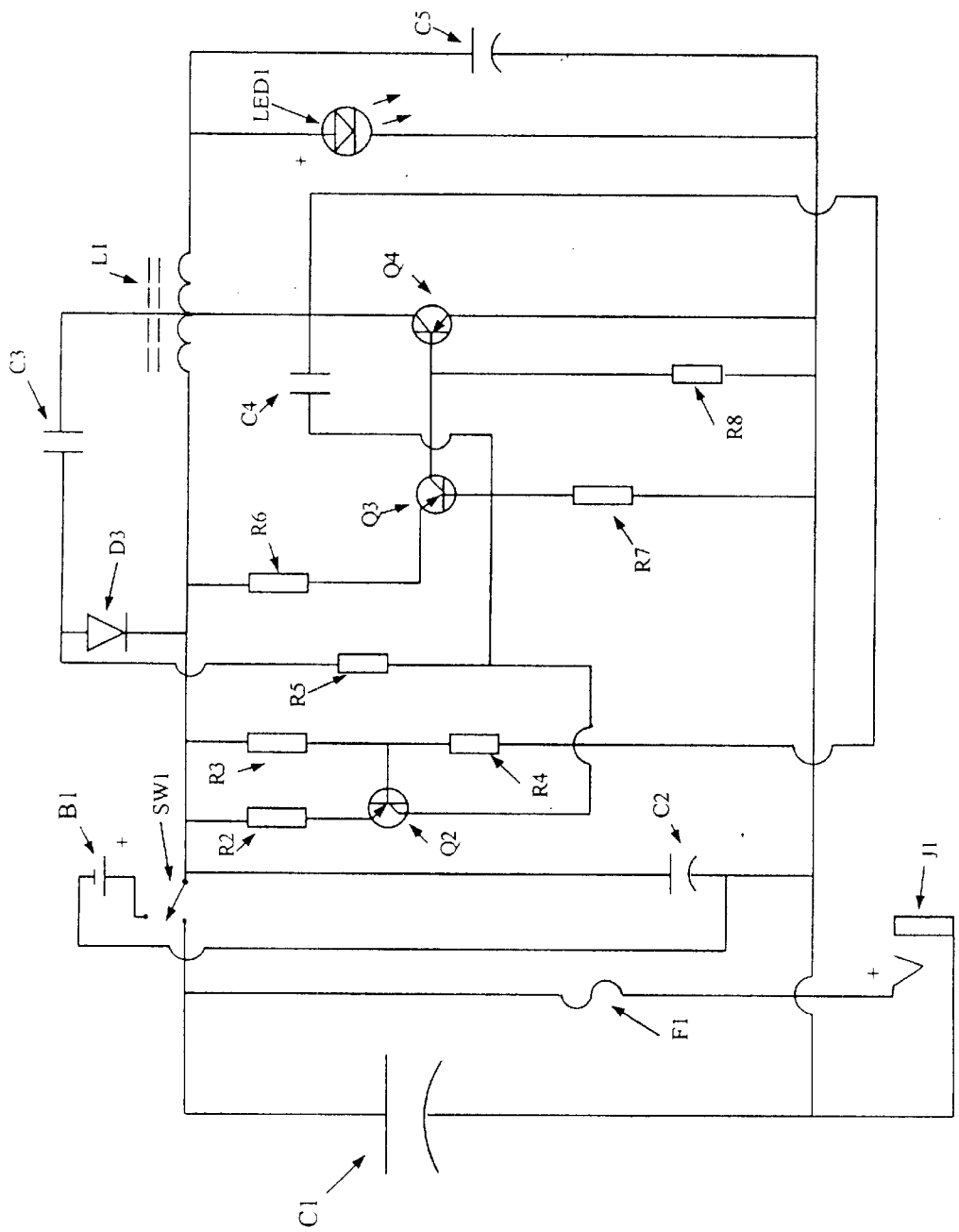
FIG. 4 is a schematic of the present invention showing the AC and auto-charging plug, and the preferred light output inverter circuit.

FIG. 4 is a schematic diagram of a rechargeable light using the inverter circuit described in FIG. 1 and a charging jack J1 for its recharging power source. This figure is presented to show how the circuit described in FIG. 1 can be used in other applications such as a portable reading light, or an indoor portable home light where the recharging source does not include a solar panel (although it could), but instead only includes the means to recharge via an AC charger or an auto charger inserted into plug J1. Also shown in this circuit are the means to use a single 1.5 V battery B1 as a power back-up source. SW1 can be switched On from C1 or from B1. The use of a single battery, such as a AAA battery, in this embodiment could be particularly useful in the case of a portable reading light which needs to be small and lightweight. In this embodiment, a portable reading light could incorporate the super capacitor and the compartment for a single AAA battery, or it could consist of a AAA battery, the inverter circuit described, and the LED, making the unit very lightweight and portable.

Figure 5:
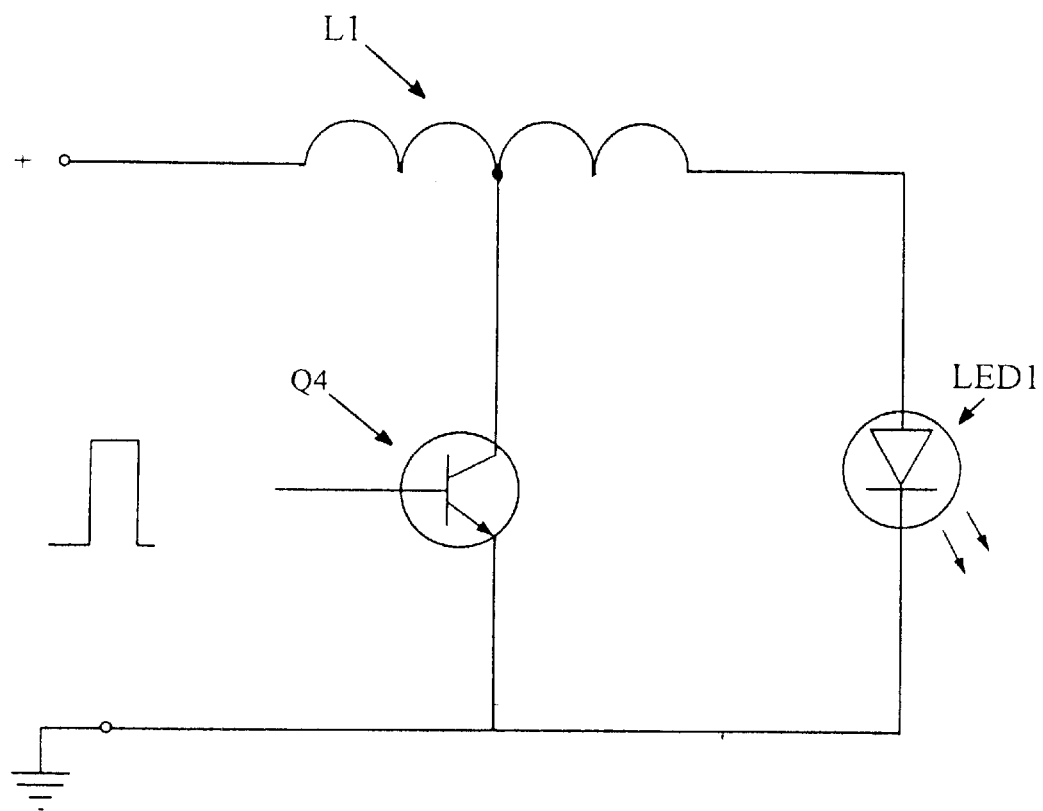
FIG. 5 is a schematic of a simplified circuit, showing the LED drive method.

FIG. 5 is a drawing of a simplified circuit showing the LED drive method (this figure was also described in FIG. 1). The input voltage is assumed lower than the LED operating voltage. When transistor Q4 is turned on, the current in L1 will ramp up and release to the LED when Q4 is turned off. The LED works similar to a conventional diode in that it will not conduct in the reverse direction. Using a tapped inductor allows for a better match for power conversion. The input is typical two volts and output is about four volts.

Figure 6:
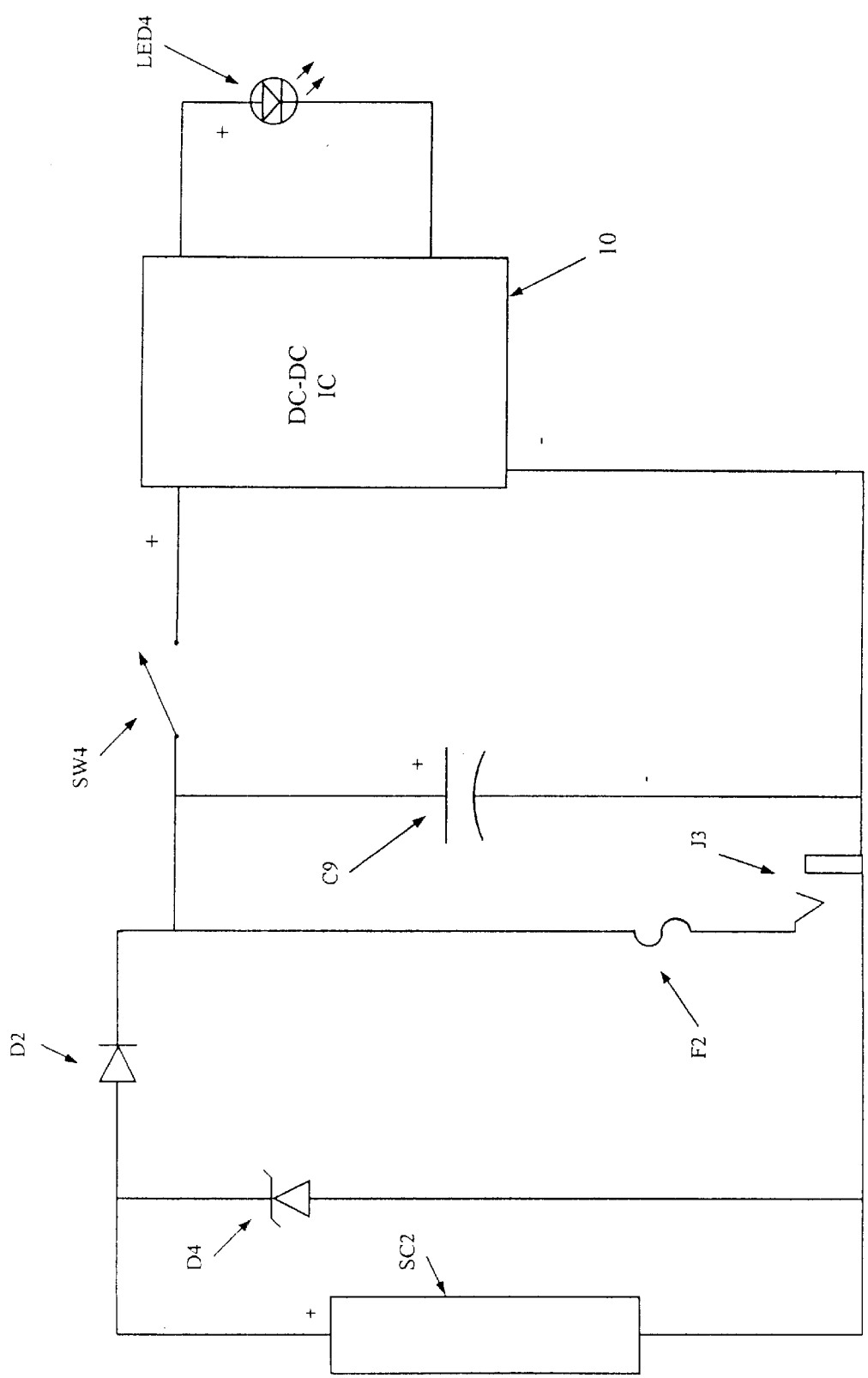
FIG. 6 is a schematic of the present invention showing a simple voltage limiting circuit on the solar panel, a higher voltage super capacitor, and a DC-DC IC used to produce correct current and voltage to the LED.

FIG. 6 is a schematic diagram of the present invention when a solar panel SC2 is used for charging C9, along with optional charging via J3 with AC or auto chargers. In this schematic, C9 is a higher voltage super capacitor such as 3 volts or higher. Zener diode D4 is used as a voltage regulator for power from SC2 to C9. A DC-DC IC, 10 is used to regulate voltage and current from C9 to LED4. The inverter circuit described in FIG. 1 can also be used as 10 with a slight modification, the specific modification depending on the voltage of C9.

Figure 7:
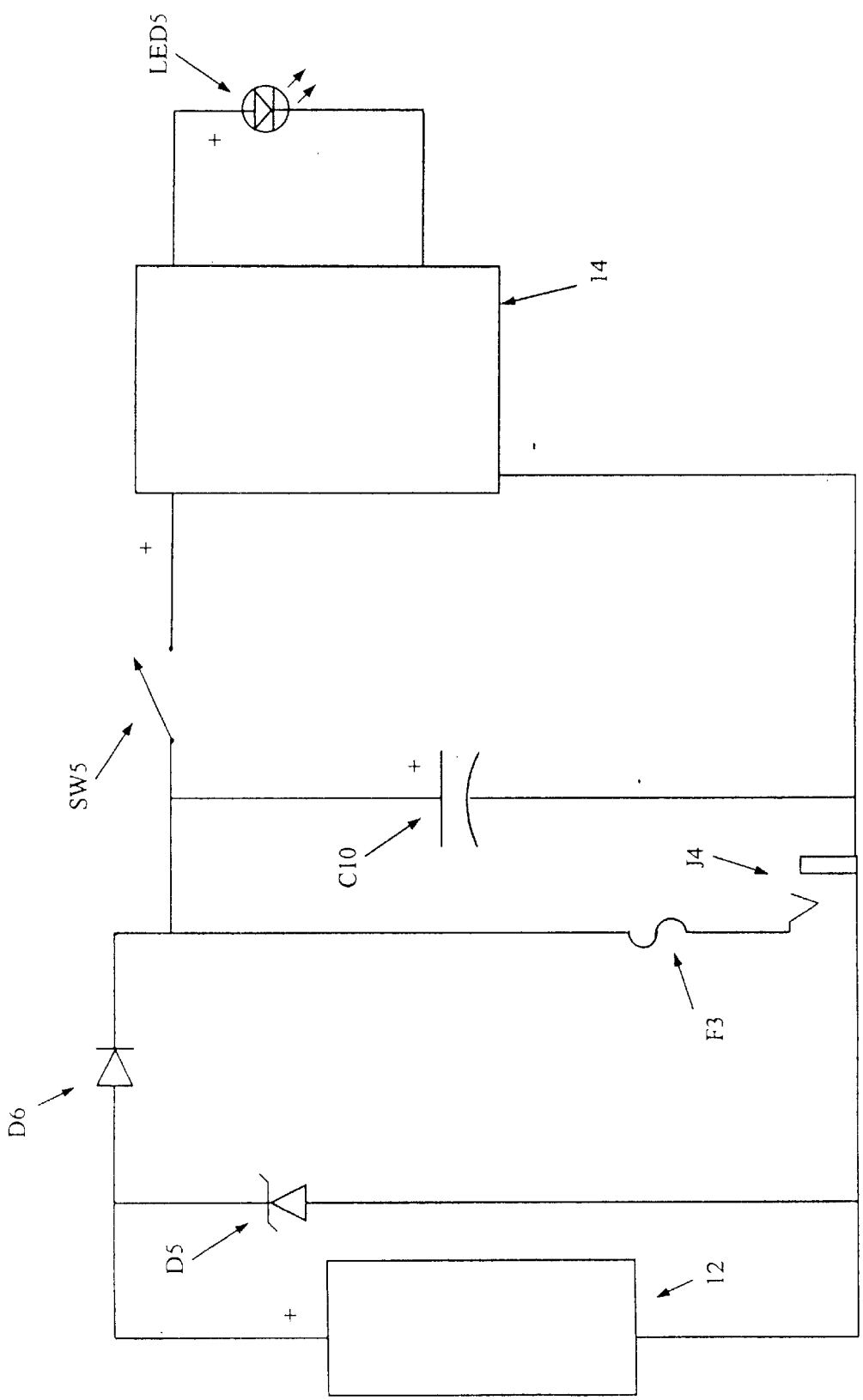
FIG. 7 is a schematic of the present invention showing a crank generator as a power source, a super capacitor for power storage, and an inverter circuit or DC-DC IC for power output to the LED.

FIG. 7 is a schematic diagram of the present invention showing a circuit where 12 is a crank generator used to charge C10. Voltage regulation can be accomplished with D5 or the regulator circuit describe previously in FIG. 1. C10 can be a 2.5 volt super capacitor or a higher voltage super capacitor. 14 can be the inverter circuit described in FIG. 1, or this inverter circuit with modification for higher voltage super capacitors, or it can be a DC-DC IC when C10 is a higher voltage capacitor.

Figure 8:
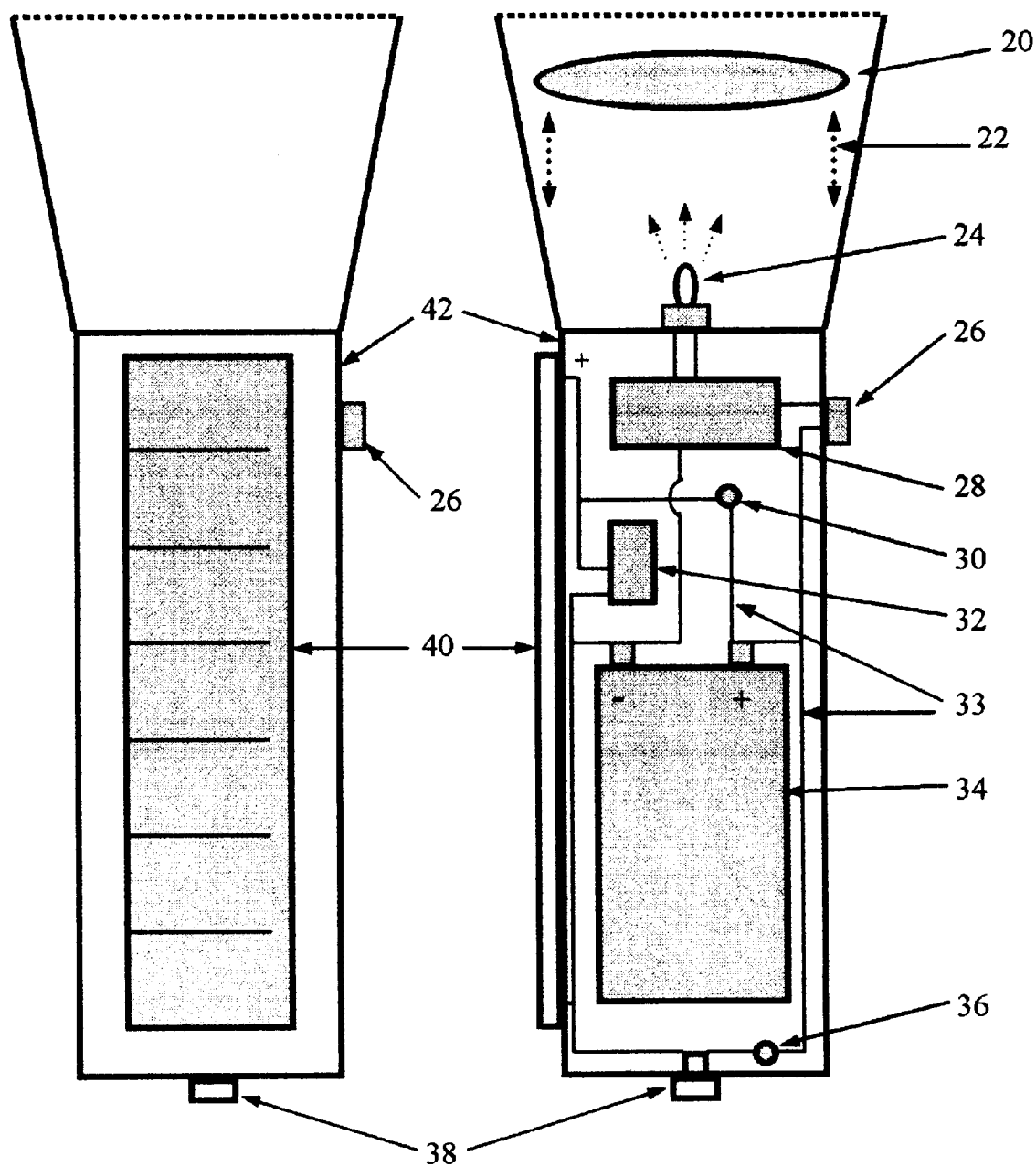
FIG. 8 shows a side elevation view of the present invention shown embodied as a flashlight, and also shows a cross sectional side view in elevation of the flashlight.

FIG. 8 shows the present invention embodied as a flashlight. FIG. 8 first shows a side elevation of the exterior case 42 of the flashlight showing locations of the on/off switch 26, the solar panel 40 and the charging outlet 38. FIG. 8 is a cross sectional side elevation view showing the interior of the flashlight including the adjustable focusing lens 20. Arrows 22 show the movement of the focusing lens 20 during adjustment. Repeated testing of this invention indicated that when focusing lens 20 was adjusted at it furthest distance from LED 24 for a narrow, focused beam, the light beam was able to illuminate objects up to 150 feet in distance (in darkness) with only one LED. In our prototype, an LED with a 20-degree light reflectance was used along with a reflective cone (the same kind as used in traditional flashlights) not shown in this drawing. Light shining on solar panel 40 is converted to electrical energy and stored by capacitor 34. Overcharge circuit 32 is in line with solar panel 40 to prevent overcharging of capacitor 34, and blocking diode 30 prevents current leakage from 34 to 40. Capacitor 34 can also be charged via a car or home charger (or an external crank-generator charger), each of which supplies 2.5 V, DC and is plugged in plug 38 for rapid charging. Alternatively, a home and or auto charging circuit can be embodied within the portable light case so that a flip out AC plug could be used to plug into a home outlet, or a cigarette lighter plug could pull out from the unit for charging in a car. Fuse 36 is necessary in line with the AC or car charging circuit because any short in this system would cause the capacitor to discharge quickly. When switch 26 is turned on, power from 34 flows to output circuit 28 and to LED 24 to produce light.

Figure 9:
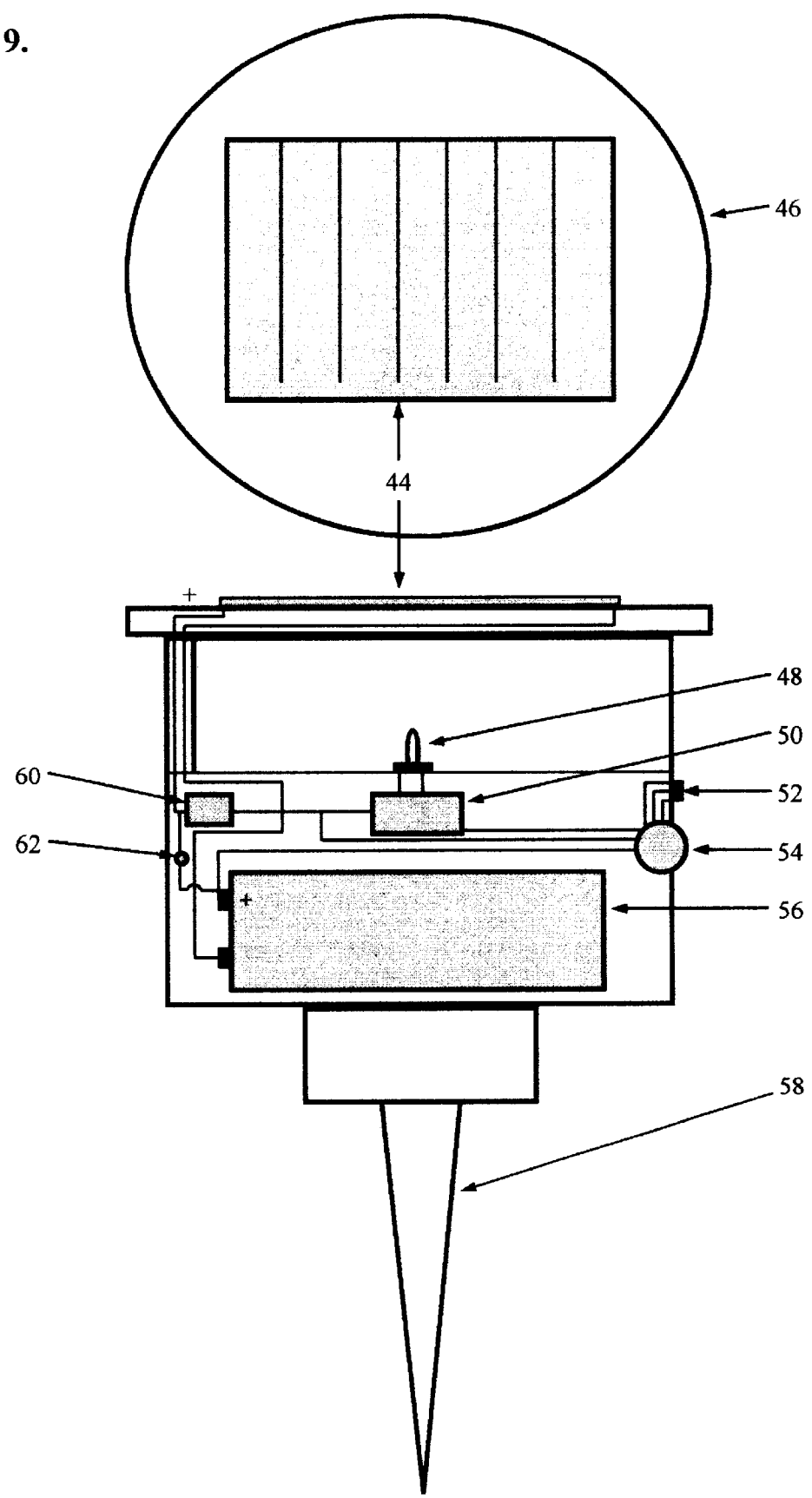
FIG. 9 shows a front elevation view of the top of the unit of the present invention shown embodied as an outdoor landscaping light, and shows a cross sectional side elevation view of the outdoor landscaping light embodiment.

FIG. 9 depicts the present invention embodied as an outdoor landscaping light. FIG. 9 shows the top of the unit with the solar panel 44 on its surface. FIG. 9 is a cross sectional side elevation view of the light of FIG. 9. Light shining on 44 is converted to electricity and stored in capacitor 56. Circuit 60 prevents overcharging of 56, and blocking diode 62 prevents power leakage from 56 back to 44. Switch 52 has three settings: On, Off and Timer. When 52 is put in the On position, power from 56 flows to output circuit 50 and to LED 48 to produce light. When 52 is in the Off position the light is turned off. When 52 is put in the "Timer" position, the timer 54 controls when the light is on or off according to its programming. Power from 56 is used to operate timer 54. Timer 54 is a standard programmable timer for a lighting application used in many previously described prior arts, and is not described in detail here.

Figure 10:
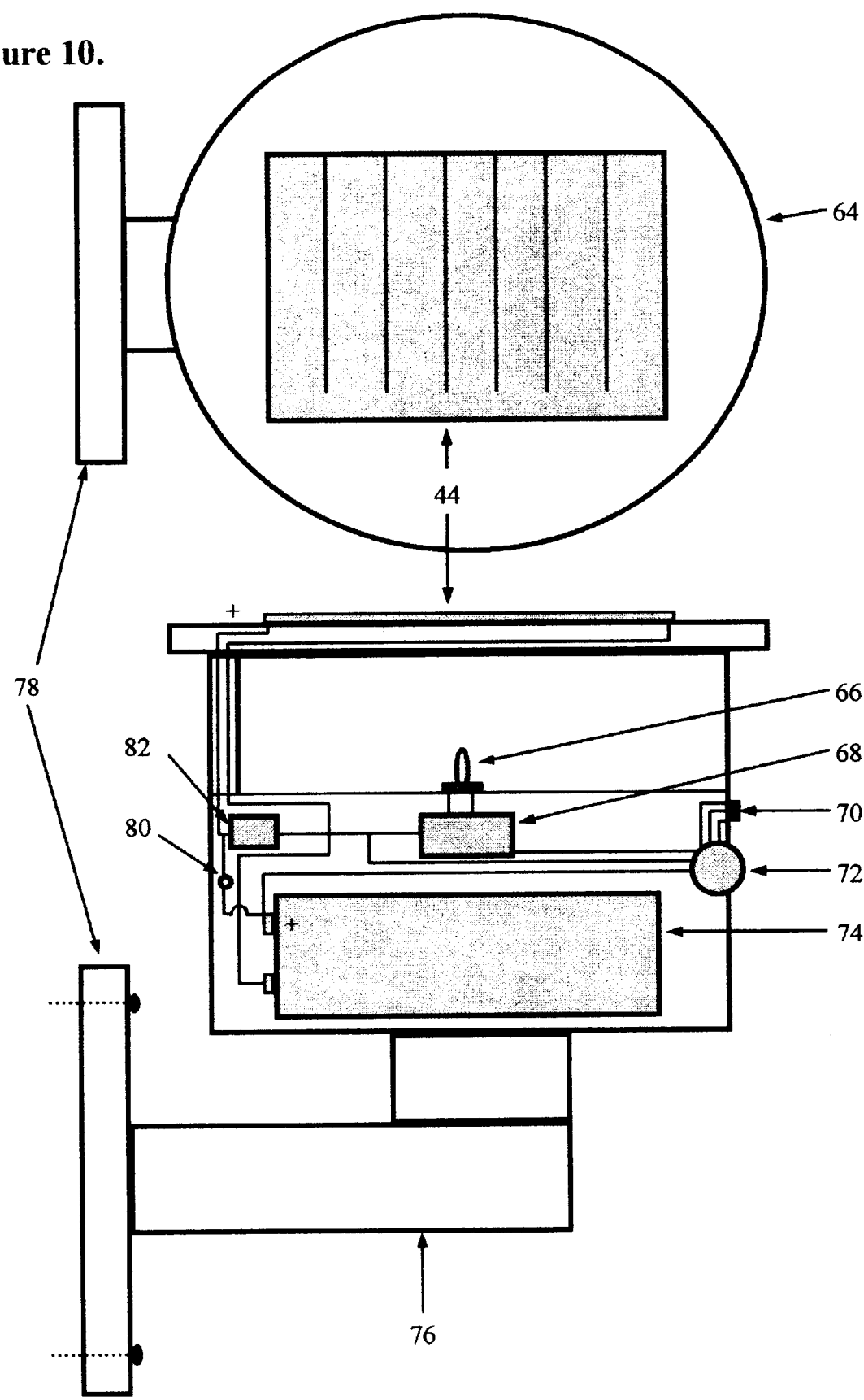
FIG. 10 shows a front elevation view of the top of the unit of the present invention shown embodied as an outdoor house light and shows a cross sectional side elevation view of the outdoor house light embodiment.

FIG. 10 shows drawings of the present invention embodied as an outdoor house light. FIG. 10 shows the location of the solar panel 44 on the top of the unit, and the mounting base 78 for mounting to the side of a house or on any structure near a house. FIG. 10 also shows a cross sectional side elevation view of the light. The components, wiring and operation of this embodiment are identical to those described in FIG. 9.

Figure 11:
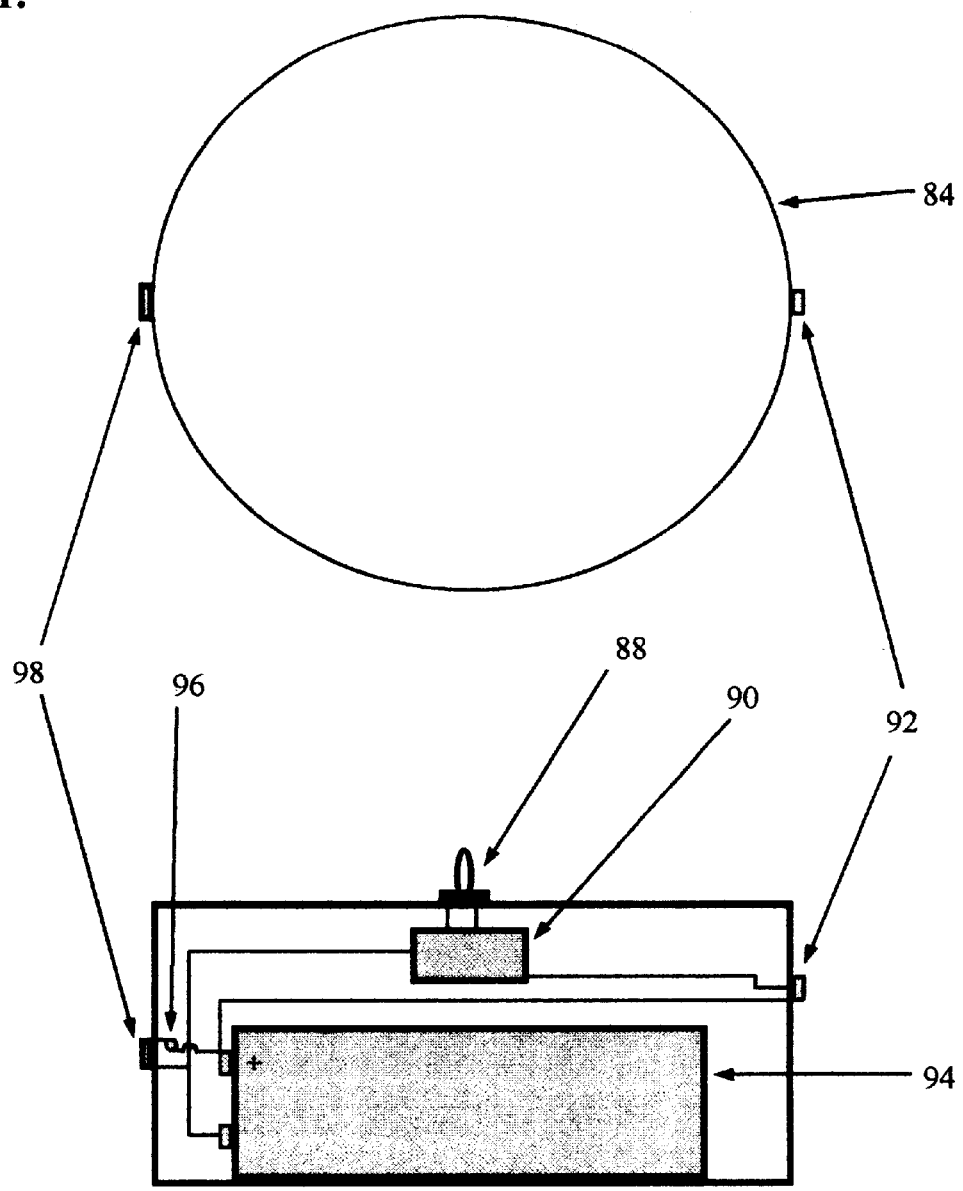
FIG. 11 shows a front elevation view of the top or bottom of the unit of the present invention shown embodied as an indoor portable, self-contained light and secondly shows a cross sectional side elevation view of the indoor portable, self-contained home light embodiment.

FIG. 11 shows the present invention embodied as an indoor portable light that can be used in closets, hallways, etc., where there is the need for temporary light for short periods of time. This embodiment is designed to be used where house wiring is difficult to install, or where one wants a light which is easy to install and operate. It is designed to be quickly charged with a portable AC charger by a quick removal of the entire portable light and plugging in an AC charge plug into outlet 98. In this embodiment, charging of capacitor 94 is simple and direct via an AC charger. When switch 92 is turned on, power flows from 94 to output circuit 90 and to LED 88 to produce light.

Figure 12:
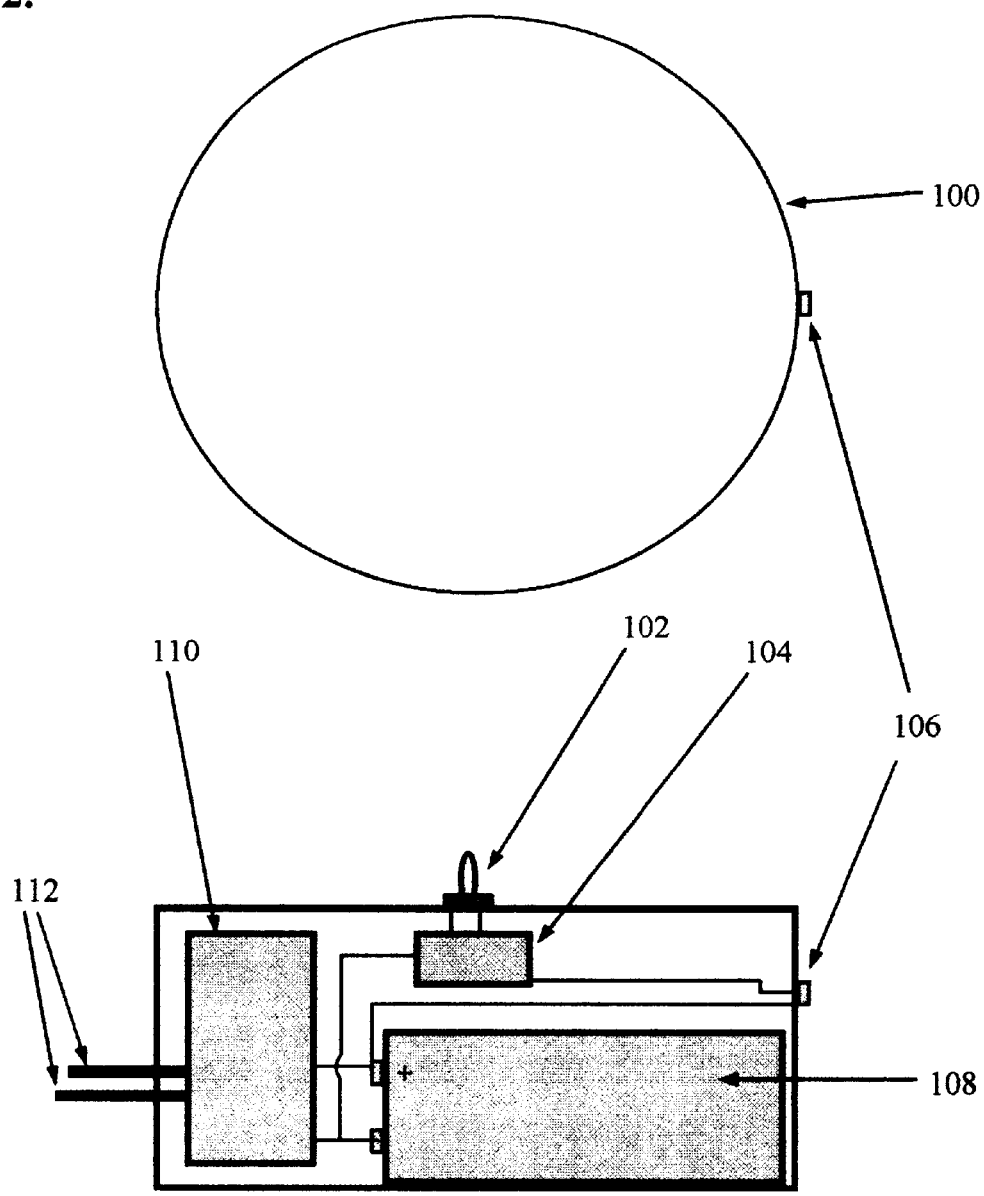
FIG. 12 shows a top view of the unit of the present invention shown embodied as an indoor home light with hard wiring, or an AC plug and then shows a cross sectional side elevation view of the indoor home light embodiment.

FIG. 12 shows drawings of the present invention embodied as a portable indoor house light. In this embodiment, there is no charging outlet. Instead, there is a power converting circuit 110 consisting of a simple transformer and rectifying circuit to convert 120 volts AC, to 2.5 V, DC to charge capacitor 108; or circuit 110 can be a linear regulator circuit. Leads 112 are either a flip out AC plug which can be plugged into an ordinary 120 V house outlet (this embodiment is designed to be easily removed from its location for this purpose), or hard wired to the house wiring in the case of a house that runs on an electrical generator system. In this case, the advantage of this light design is that the home generator can be turned on for only a minute or two to charge up 108.

Figure 13:
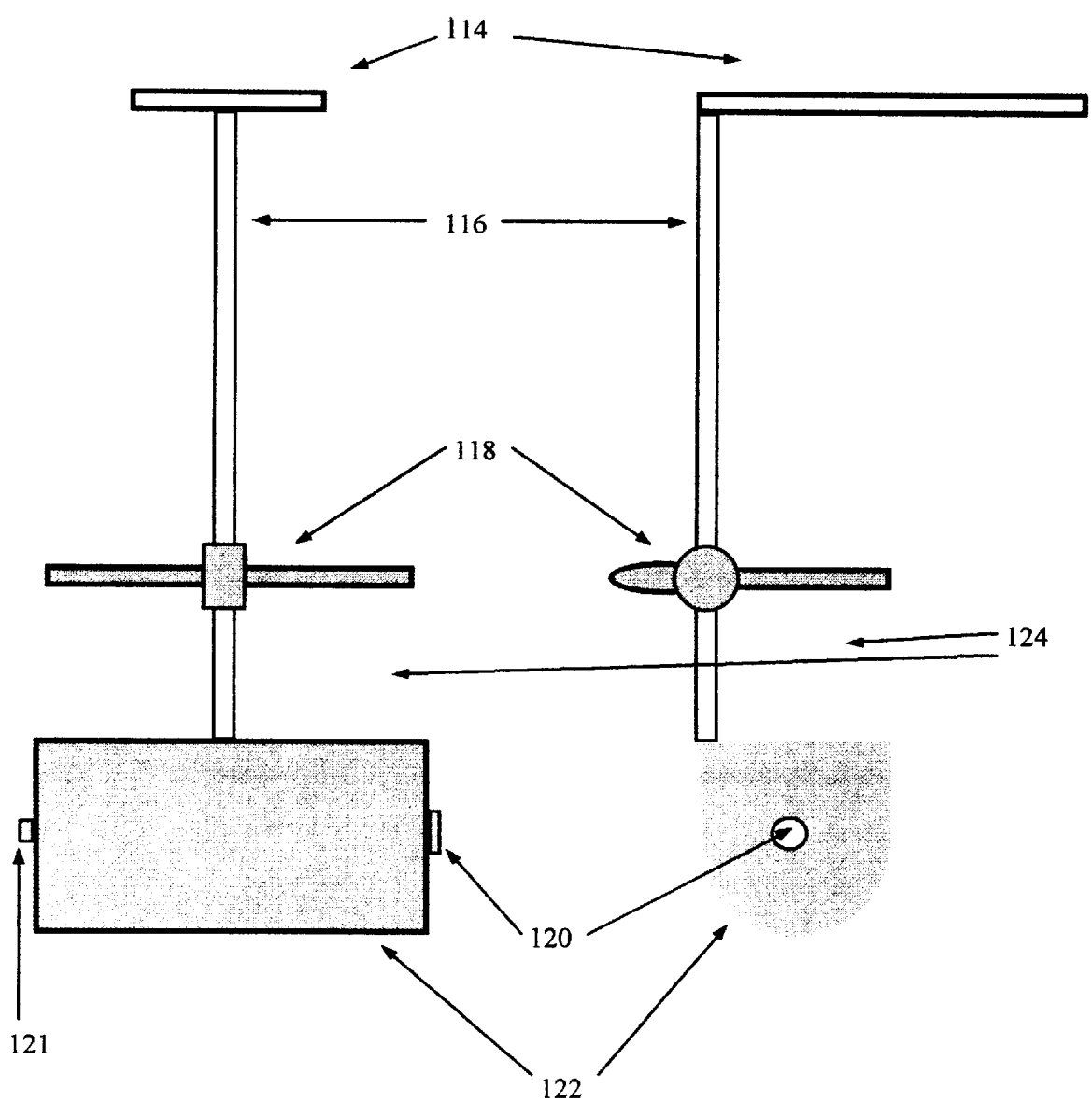
FIG. 13 shows a front elevation view of unit of the present invention shown embodied as a portable reading light and then shows a cross sectional side elevation view of the portable reading light embodiment.

FIG. 13 shows drawings of the present invention embodied as a portable reading light. FIG. 13 shows the front elevation view and the side elevation view. Compartment 122 holds the super capacitor and power inverter circuit, and is lightweight. When switch 121 is turned on, power flows from the capacitor to the inverter circuit and to the white LED housed in 114. The internal components and circuitry in this embodiment are exactly the same as described in FIG. 11, and therefore will not be described here. 124 represents the space where the book will rest, and 118 is an adjustable clamp that slides onto the book top surface. The front portion of 118 is spring-loaded and can be lifted up as needed to turn pages. An AC charger is plugged into 120 for quick charging of the capacitor housed in 122. With a standard 100 F capacitor, charging takes about 30 seconds, and light output on full power will last for one hour.

Figure 14:
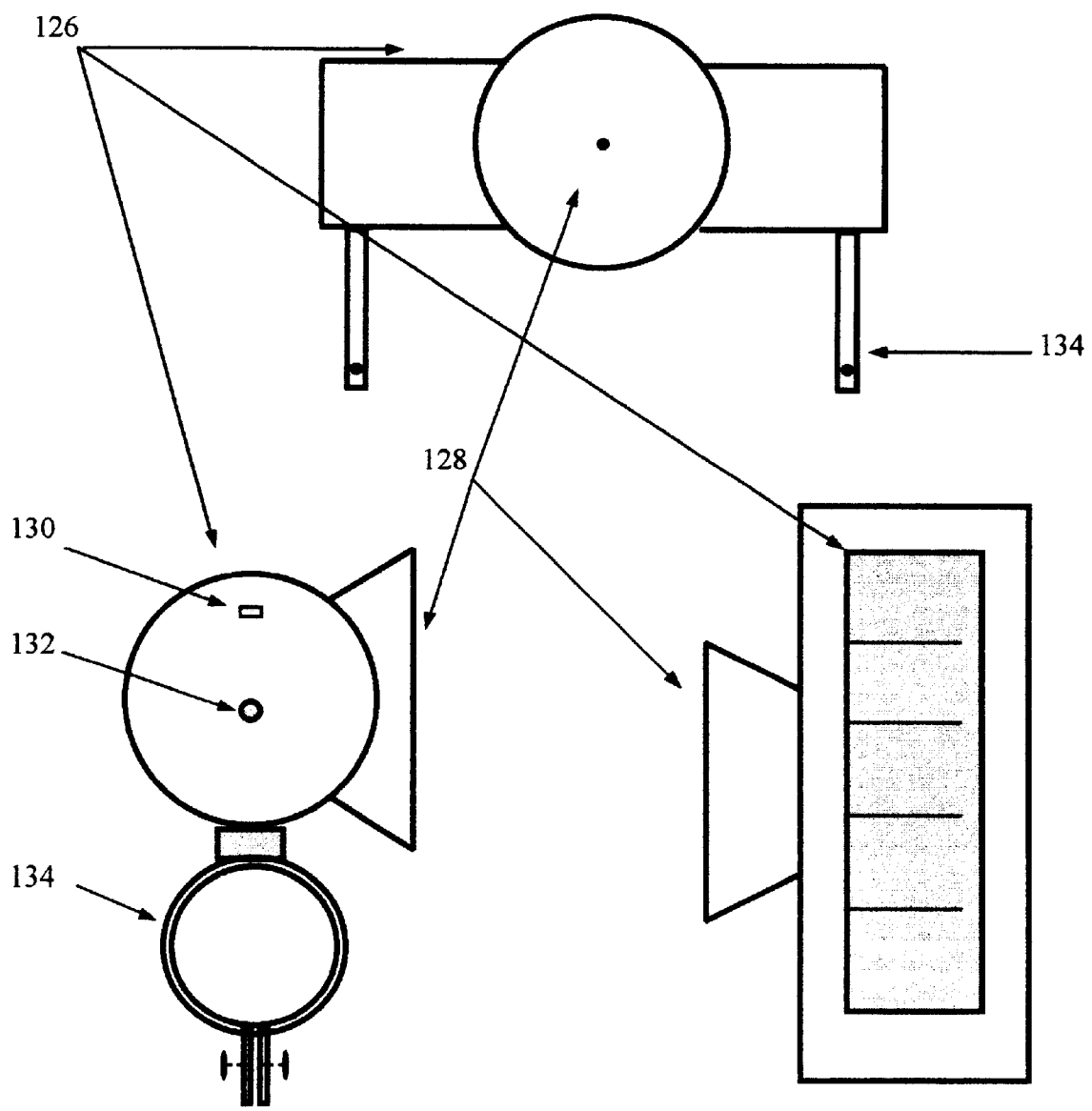
FIG. 14 shows a front elevation view of the present invention shown embodied as a bicycle light, a side elevation view of the bicycle light embodiment, and a top view of this light embodiment.

FIG. 14 shows drawings of the present invention embodied as a bicycle light. FIG. 14 is the front elevation view, and the side elevation view, and the top view. The solar panel 126 is shown located on the outside, top of the case, and the storage capacitor is located inside of the case. Housing 128 holds the LED and the reflective and focusing mechanisms necessary for light output. FIG. 14 shows clamps 134 which hold this portable light on the handle bars, or on the rear seat post in the case of a rear bicycle light. This embodiment will function well with one clamp 134 or two clamps 134. Switch 130 turns the light on or off. Quick charging is accomplished by plugging an AC or car charger into outlet 132. Solar panel 126 will also charge the unit whenever there is sufficient light available. The internal components and circuitry for this embodiment are exactly the same as described in FIG. 8 and therefore will not be described here. In the case where this light is used for a rear bicycle light, a red LED is used in place of the white LED.

Figure 15:
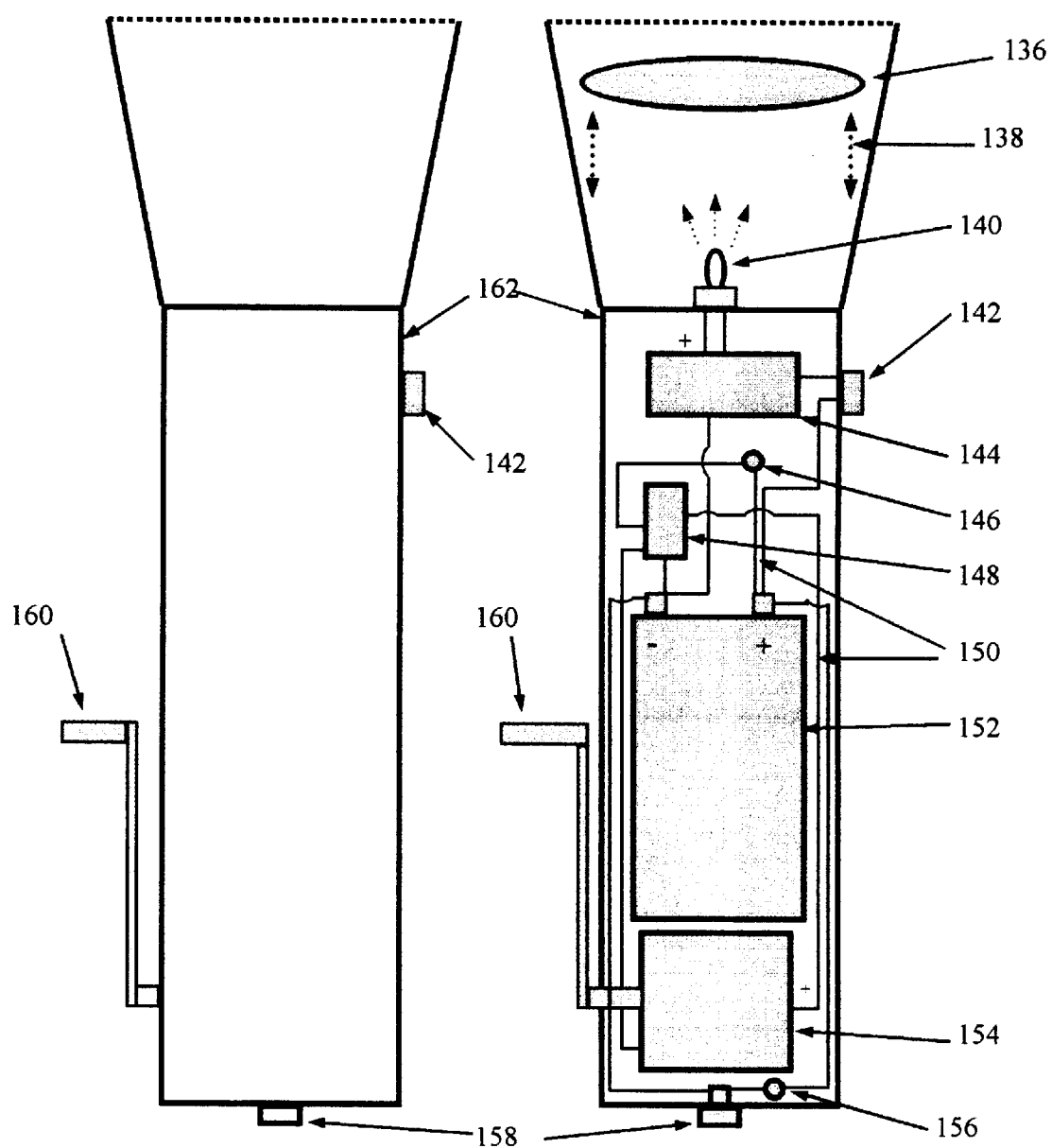
FIG. 15 shows a side elevation view of the present invention shown embodied as a flashlight with a crank-generator charging system, and a cross sectional side elevation view of the flashlight with crank-generator charging system.

FIG. 15 shows drawings of the present invention shown embodied as a flashlight with a crank-generator charging system, a side elevation view and a cross sectional side elevation view are shown. All internal circuitry and components are the same as described in FIG. 8 (with or without the solar panel) except for the addition of the internal mechanical generator 154. When this generator is activated by turning crank 160, electricity is generated which travels to circuit 148 to limit the voltage and protect capacitor 152 from overcharging, before traveling to 152 for storage. Crank 160 is designed to fold into an indentation in the case when not in use.

Figure 16:
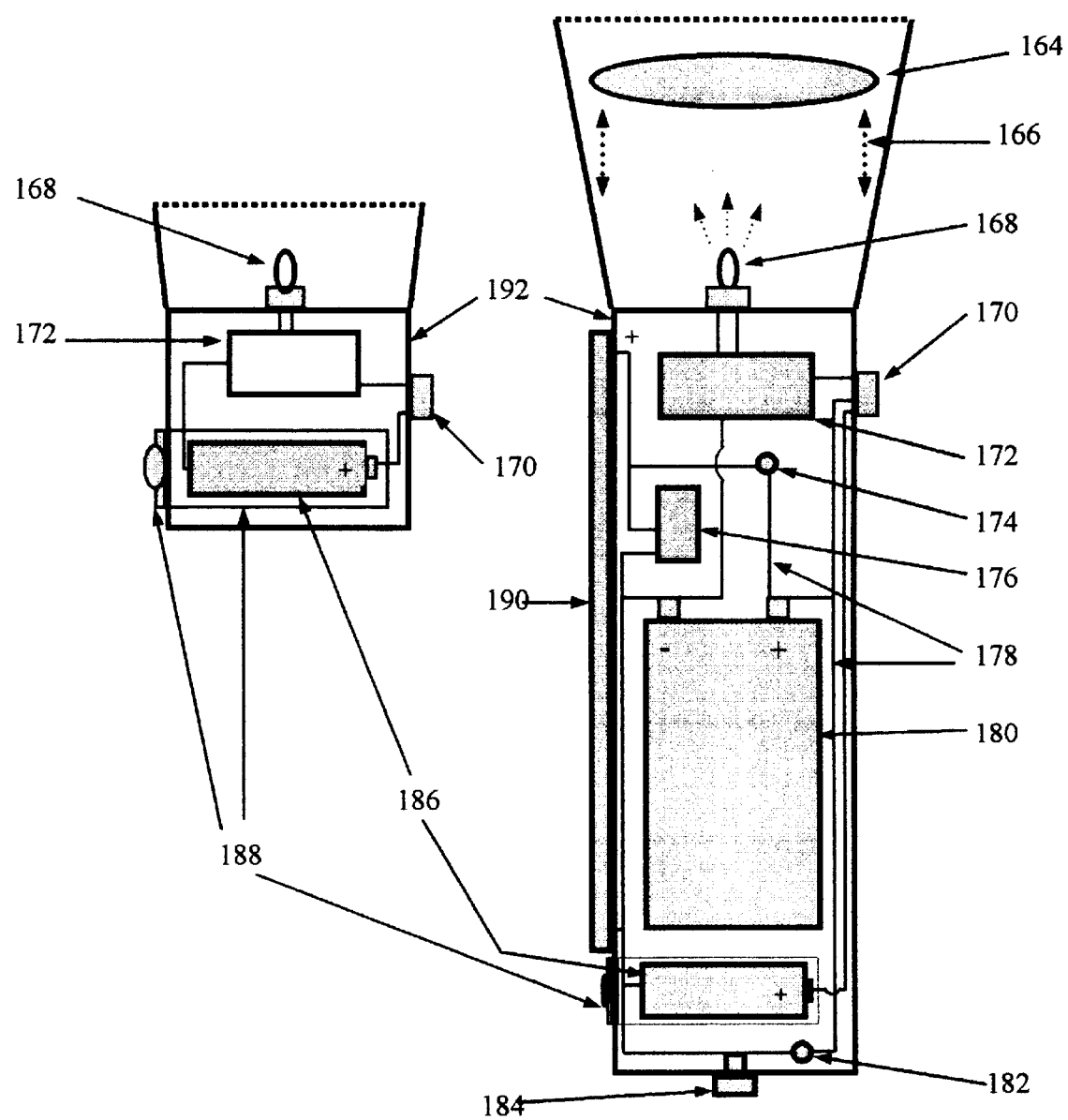
FIG. 16 shows a cross sectional side elevation view of the present invention shown embodied as a flashlight, having an optional battery for power backup; and also shows a side elevation view of the present invention shown embodied as a flashlight with exactly the same components and circuitry as that shown in FIG. 8, except for the addition of an optional battery as a backup power supply.

FIG. 16 shows drawings of the present invention shown embodied as a flashlight which includes an optional single 1.5 volt battery as a backup power supply to capacitor 180. The only addition to circuitry compared to FIG. 8 is that switch 170 now has three settings: On from capacitor 180, On from battery 186, or Off. Both capacitor 180 and battery 186 provide low voltage to inverter circuit 172, which increases voltage to about 4 V and keeps current steady at about 22 to 23 mAmps to power LED 168. Battery 186 is inserted or removed via door 188. FIG. 16 is shown to demonstrate that a single 1.5 volt battery 186 can be used with inverter circuit 172 to power a high brightness LED 168. This also illustrates that the flashlight can be quite compact.

What is claimed as invention is:

1. A rechargeable portable or fixed light, comprising: a housing member having an opening for the emission of light; at least one charging means; an electronic output circuit for providing power for and control of the emission of light, said circuit located within said housing member; at least one super capacitor for power storage, said super capacitor charged by said charging means, a voltage limiting circuit for charging said super capacitor interposed between said super capacitor and said charging means, at least one light emitting diode (LED) positioned near the opening in said housing member, and a switch interposed between said capacitor and said electronic output circuit, said switch being open when the capacitor is charging and closed when power is delivered from said capacitor to said output electronic circuit and said at least one LED.

2. The rechargeable light of claim 1 further including an inverter circuit for increasing and maintaining voltage and regulating the desired current from said super capacitor to said LED.

3. The rechargeable light of claim 1, further including a 1.5 volt battery single cell battery as a power backup to the super capacitor.

4. The rechargeable light of claim 1 wherein said at least one charging means comprises a solar panel located on the exterior of said housing and electrically connected to said voltage limiting circuit to charge said super capacitor; said voltage limiting circuit, limiting the charging voltage to said super capacitor to prevent damage to super capacitor as voltage increases from solar panel.

5. The rechargeable light of claim 1, wherein said charging means comprises an external power supply selected from the group consisting of a 12 volt auto charger, an AC home outlet charger, and a hand crank generator charger, and further including a charging jack adapted for electrically connecting said charging means to said electronic circuit.

6. The rechargeable light of claim 1, wherein said charging means comprises both a solar panel located on the exterior of said housing and electrically connected to said voltage limiting circuit, and an external power supply selected from the group consisting of a 12 volt auto charger, an AC home outlet charger, and a hand crank generator charger, and wherein said electronic circuit further includes a charging jack adapted for electrically connecting said charging means to said electronic circuit.

7. The rechargeable light of claim 1, wherein said LED is a high brightness white LED, or other colored LED.

8. The rechargeable light of claim 1, wherein said light has at least two super capacitors for providing power to said at least one LED.

9. The rechargeable light of claim 8, wherein said electronic circuit further includes a switch mechanism interposed between said charging means and said at least two super capacitors, said switch mechanism including a first and second plurality of sub-switches, such that when said second plurality of sub-switches are closed, said first sub-switches are open, and said at least two super capacitors are put in parallel for charging at specified voltages, and such that when said first plurality of sub-switches are closed, said second plurality of sub-switches are open and said super capacitors are put in series for voltage increase and subsequent current regulation to said LED.

10. The rechargeable light of claim 1, wherein said light is a flashlight or similar portable light.

11. The rechargeable light of claim 1, wherein said light is an outdoor light used for landscaping or other outdoor uses.

12. The rechargeable light of claim 1, wherein said light is an outdoor house or building light.

13. The rechargeable light of claim 1, wherein said light is an indoor portable light or fixed light for general uses, or for emergency uses.

14. The rechargeable light of claim 1, wherein said light is a bicycle light for front or rear illumination.

15. The rechargeable light of claim 1, wherein said light is a portable reading light.

16. The rechargeable light of claim 1, wherein said super capacitor has a capacitance of 1 Farad or higher and a voltage of 2.0 volts or higher.

17. The rechargeable light of claim 1, wherein said super capacitor has a capacitance of 1 Farad or higher at voltages of 2.0 volts or higher, and wherein power is transferred to said LED or other illumination device by a DC-DC integrated circuit.

18. The rechargeable light of claim 1, wherein said super capacitor has a capacitance of 1 Farad or higher at voltages higher than 2.0 volts, and wherein current is regulated to said LED by a resistor.

19. The rechargeable light of claim 1 wherein said super capacitor has a voltage of 3 volts or higher and a capacitance of 1 Farad of higher, a solar panel for charging and a zener diode used as a voltage limiting device interposed between said solar panel and said super capacitor.

* * * * *